US008387714B2

(12) United States Patent
Uchijima et al.

(10) Patent No.: US 8,387,714 B2
(45) Date of Patent: Mar. 5, 2013

(54) REAR IMPLEMENT MOUNTING FRAME CONSTRUCTION FOR TRACTOR (75) Inventors: Akiyoshi Uchijima, Sakai (JP); Koji Saito, Sakai (JP)

(73) Assignee: Kubota Corporation, Osaka (JP)

( * ) Notice: Subject to any disclaimer, the term of this patent is extended or adjusted under 35 U.S.C. 154(b) by 209 days.

(21) Appl. No.: 11/854,125

(22) Filed: Sep. 12, 2007

(65) Prior Publication Data
US 2008/0202779 A1 Aug. 28, 2008

(30) Foreign Application Priority Data

Feb. 22, 2007 (JP) ................................. 2007-041580

(51) Int. Cl.
*A01B 51/00* (2006.01)
(52) U.S. Cl. ........................................................ 172/272
(58) Field of Classification Search .................... 172/272
See application file for complete search history.

(56) References Cited

U.S. PATENT DOCUMENTS

| 2,533,521 | A | * | 12/1950 | Silver et al. .................... 172/272 |
| 2,782,704 | A | * | 2/1957 | Jackson ......................... 172/269 |
| 4,034,998 | A | * | 7/1977 | Iijima et al. ................. 280/461.1 |
| 4,087,009 | A | * | 5/1978 | Profenna et al. .............. 414/686 |
| 4,182,456 | A | * | 1/1980 | Paul .............................. 414/685 |
| 5,000,269 | A | * | 3/1991 | Aoki et al. .................... 172/248 |
| 6,729,431 | B2 | * | 5/2004 | Osuga et al. .................. 180/312 |
| 7,001,134 | B2 | * | 2/2006 | Aoki et al. .................... 414/686 |
| 7,010,874 | B2 | * | 3/2006 | Uchijima et al. ............... 37/417 |
| 7,073,603 | B2 | * | 7/2006 | Nordhoff ....................... 172/272 |

FOREIGN PATENT DOCUMENTS

JP 2004-114762 4/2004

\* cited by examiner

*Primary Examiner* — Thomas B Will
*Assistant Examiner* — Joel F. Mitchell
(74) *Attorney, Agent, or Firm* — The Webb Law Firm (57) ABSTRACT A rear implement mounting frame construction for a tractor is disclosed. The construction comprises a pair of mounting frames attached respectively to right and left sides of a tractor body. Each of these mounting frames comprises a plate member having a plate thickness oriented along the right/left direction. Each mounting frame also includes a case mounting portion that is connected to a rear axle case of the tractor body and a vertical connecting portion formed rearwardly of the case mounting portion which connects a rear implement. A bent portion formed between the case mounting portion and the vertical connecting portion causes the vertical connecting portion to be disposed closer to the tractor body than the case mounting portion. A right/left distance between the vertical connecting portions is set smaller than a right/left distance between the case mounting portions.

5 Claims, 8 Drawing Sheets

* # REAR IMPLEMENT MOUNTING FRAME CONSTRUCTION FOR TRACTOR

TECHNICAL FIELD

The present invention relating to a rear implement mounting frame construction for a tractor for mounting a rear implement such as a backhoe to a rear side of the tractor.

BACKGROUND ART

With this type of conventional art, a pair of right and left mounting frames are disposed on the right and left sides of the tractor body. Each one of the right and left mounting frames is formed of a plate member having a plate thickness along the right/left direction. The mounting frame includes a front mounting portion to be connected to a mounting body for mounting a front implement such as a front loader, a case mounting portion to be connected to a rear axle case of the tractor body and a vertical connecting portion formed rearwardly of the case mounting portion and for connecting a rear implement.

This mounting frame has a flat-plate like shape from the case mounting portion to the vertical connecting portion. And, right and left leg portions of a ROPS (Rollover Protection System) are connected to the rear axle case, independently of the mounting frame (see. e.g. JP2004-114762A).

DISCLOSURE OF THE INVENTION

Object to be Achieved by Invention

In a rear implement mounting frame construction for a tractor of the above-noted type, the object of the present invention is to provide a rear implement mounting frame construction which has a high strength and which is inexpensive.

Means to Achieve the Object

According to a characterizing construction of a rear implement mounting frame construction for a tractor proposed by the present invention, the construction comprises:

a pair of mounting frames attached respectively to right and left sides of a tractor body;

each of said right and left mounting frames comprising a plate member having a plate thickness oriented along a right/left direction, said mounting frame including a case mounting portion to be connected to a rear axle case of the tractor body and a vertical connecting portion formed rearwardly of said case mounting portion and for connecting a rear implement;

a bent portion formed between said case mounting portion and said vertical connecting portion, said bent portion causing said vertical connecting portion to be disposed closer to the tractor body than said case mounting portion; and a right/left distance between said pair of vertical connecting portions being set smaller than a right/left distance between said pair of case mounting portions.

With the above construction, there is formed a bent portion for causing the vertical connecting portion R to be disposed closer to the tractor body than the case mounting portion. With this, the bent portion acts like a rib, thus improving the vertical rigidity. Moreover, the right/left distance between the case mounting portions is set smaller than the right/left distance between the vertical connecting portions, thus allowing the right/left distance as required. As a result, with a simple construction, there can be obtained a rear implement mounting frame construction for a tractor, and the costs can be reduced.

In the above-described construction, preferably, at said bent portion, a right/left distance between said pair of mounting frames is progressively decreased from said right/left distance between the pair of case mounting portions to said right/left distance between said pair of vertical connecting portions.

With this construction, at the bent portion, a right/left distance between the mounting frames is progressively decreased from the right/left distance between the case mounting portions to the right/left distance between the vertical connecting portions, so that the right/left distance can be set as required.

In the above-described construction, preferably, a vertical size of said each mounting frame is progressively increased from said case mounting portion to said vertical connecting portion.

With this construction, as the vertical size of each mounting frame is progressively increased from the case mounting portion to the vertical connecting portion R, the mounting frame can support sufficiently over its entire length the load applied to the tractor body. Further, the construction can improve the load distribution also.

Further, in the above-described construction, preferably, in each right and left mounting frames, forwardly of an upper connecting portion of said vertical connecting portion, there is connected a right or left leg portion of a rear erect frame having a portal shape.

With this construction, as forwardly of an upper connecting portion of said vertical connecting portion, there is connected a right or left leg portion of a rear erect frame having a portal shape, the load can be distributed in the right and left mounting frames. In addition, as no special member is needed for the attachment of the rear erect frame to the tractor body, the costs can be reduced.

In the above, for the attachment of each one of the right and left mounting frames to the rear axle case, there is conceivable a construction in which a large cutout engaging portion is formed for engaging the rear axle case from its lower portion to the case mounting portion and an engaging portion reinforcing member is provided for reinforcement at an upper portion of the rear axle case for connecting front and rear portions of the cutout portion which have been weakened by the formation of the cutout engaging portion.

With the above construction also, it is possible to achieve the object of the invention. However, this construction requires the cutout engaging portion for the engagement with the rear axle case and a rear support member, although the construction allows mounting of the mounting frame without requiring detachment of the rear wheel. Further, this construction results in weakening of the mounting frame, which then needs to be reinforced with the engaging portion reinforcing member. Hence, the strength of the mounting frame per se may be slightly reduced.

Then, in the above construction, preferably, said case mounting portion defines an insertion hole for allowing insertion of a rear axle therein, a periphery of said insertion hole, as the rear axle being inserted therein, being attached to an outer end face of said rear axle case.

With this construction, the periphery of the insertion hole is attached to an outer end face of the rear axle case, with the rear axle being inserted therein in the insertion hole. Therefore, although this construction requires detachment of the rear wheel before mounting of the mounting frame to the rear axle case, no cutout engaging portion is formed. So that, even a single plate member per se can provide the required strength. Hence, attachment of the mounting frame is possible without needing to provide the support member to the outer face of the rear axle case. As a result, the attaching construction for the mounting frame can be formed inexpensively.

BEST MODE OF EMBODYING THE INVENTION

In FIGS. 1-4, numeral 1 denotes a tractor-front-loader-backhoe (TLB). A tractor body 2 is reinforced by a pair of right and left mounting frames 3 and from an intermediate portion to a front portion of the body 2, there is detachably mounted a front loader as a front implement 4. Further, to a rear portion of the tractor body 2, there is detachably mounted a backhoe as a rear implement 7 and at an intermediate lower portion of the tractor body 2, a mid-mount mower can be mounted.

Figure 3:
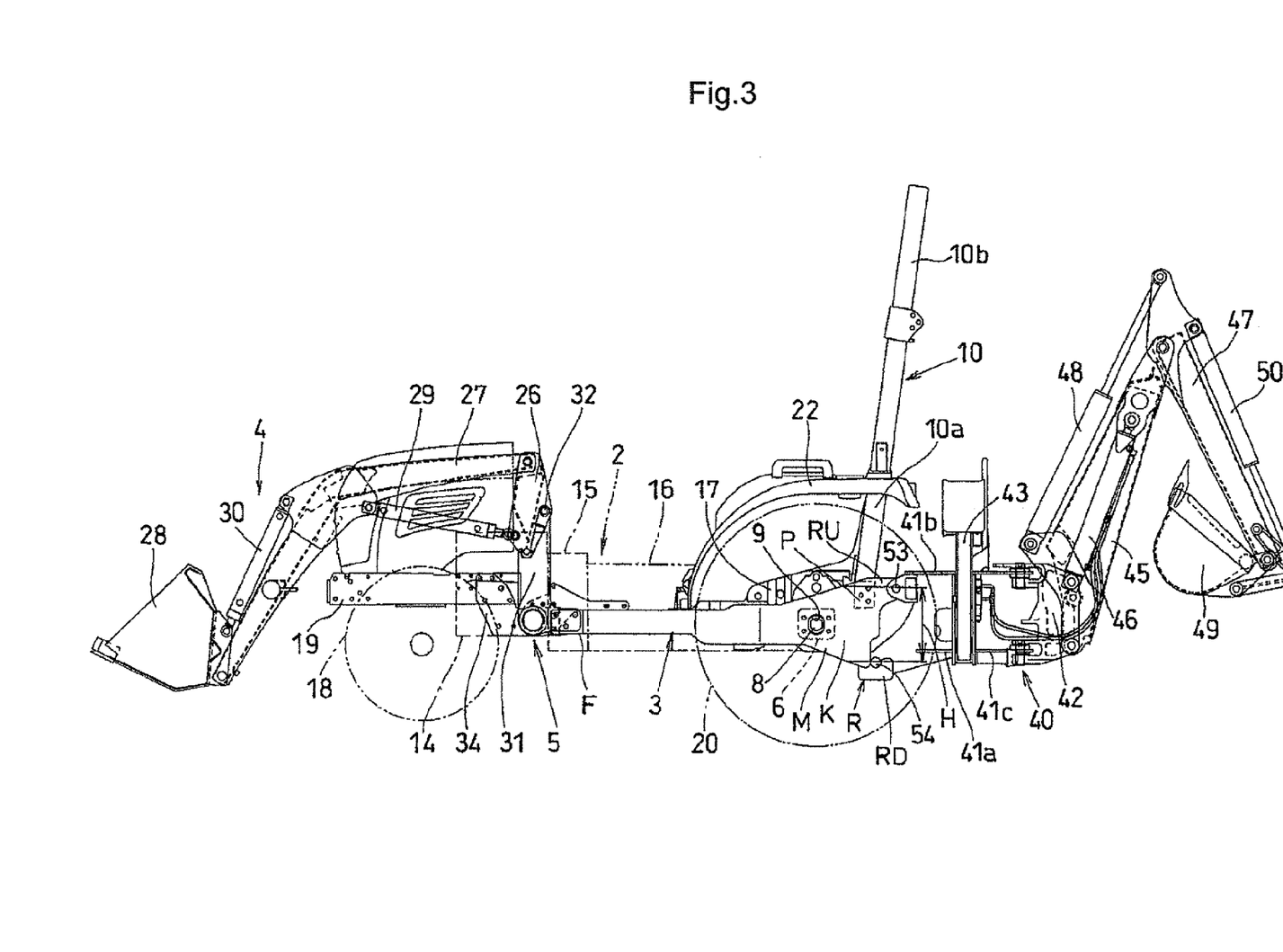
Figure 4:
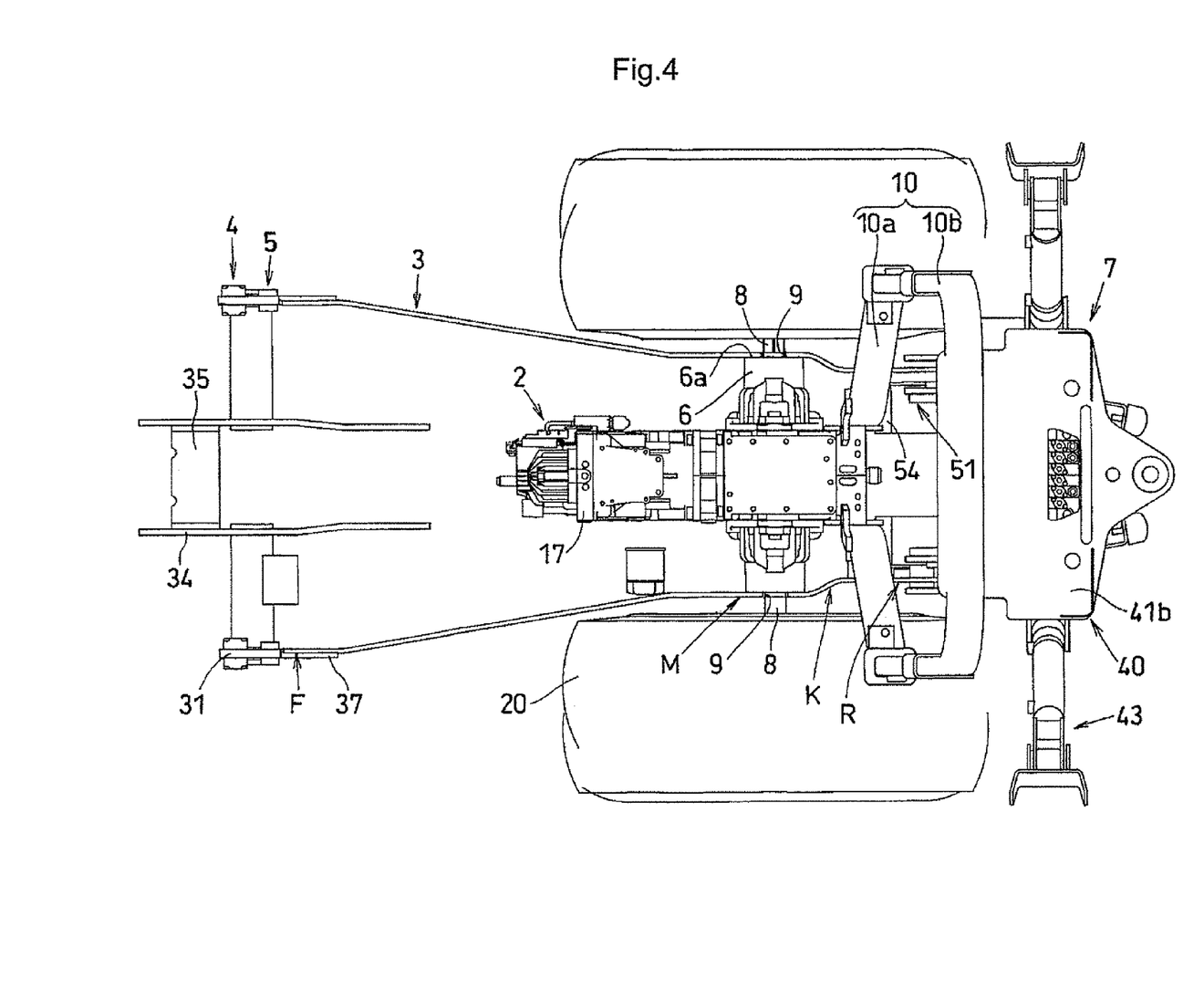

Referring to the tractor body 2, an engine 14, a clutch housing 15, a connecting case 16 and a transmission case 17 are connected in series along the front/rear direction. Forwardly from the engine 14, a front axle frame 19 projects for suspending a front axle case for front wheels 18. Rearwardly from the transmission case 17 to the right and left sides thereof, a rear axle case 6 projects. And, rear wheels 20 are suspended on rear axles 8 projecting from the rear axle case 6 to the outer sides thereof This rear axle 8 is of a type having no flange at its outer end (e.g. a hexagonal shaft).

Though not shown, on the top of the transmission case 17, there is mounted an implement lifting hydraulic unit for lifting/lowering an implement such as a rotary plow, when the above-described rear implement is not mounted. Upwardly of this hydraulic unit, there is mounted a driver's seat unit having a driver's seat which is reversible between forward and rear positions or which is oriented along the front/rear direction. From under the forward facing driver's seat to a steering section, there is provided a floor sheet. To right and left sides of this floor sheet, there are attached fenders 22 for the rear wheels 20.

To the right and left mounting frames 3, there is attached a rear erect frame 10 as a ROPS (rollover protection system), with the rear erect frame 10 interconnecting the right and left mounting frames 3 together. This rear erect frame 10 includes right and left leg portions 10a and a portal-shaped upper portion 10b, with the leg portions and the upper portion being connected via upper walls of the rear wheel fenders 22, thus serving also for the attachment of the rear wheel fenders 22. The right and left leg portions 10a are connected to the mounting frames 3, but can be fixed, at the same time, to the side faces of the tractor body 2 or the rear axle case 6.

Referring to the front loader (front implement 4), a base portion of a boom 27 is vertically pivotally supported to upper portions of right and left mast 26. A bucket 28 is pivotally supported to the leading end of the boom 27 for effecting a scooping/dumping operation. And, the boom 27 is hydraulically driven by a boom cylinder 29 and the bucket 28 is hydraulically driven by a bucket cylinder 30.

The mast 26 is engaged from above into a mast receiving member 31 of a front loader mounting body 5 and is locked at its intermediate portion by a lock pin 32. The front loader, when not used, can be detached from the mounting body 5 by pulling out the lock pin 32.

Referring to the mounting body 5, a pair of right and left attaching members 34 to be attached to a member constituting the tractor body 2 such as an engine 14 and the clutch housing 15, etc., are interconnected via a connecting plate 35 disposed downwardly of the engine 14. A support cylinder 36 projects horizontally in the right/left direction from the right and left attaching members 34, with the mast receiving member 31 projecting upward from the support cylinder 36 and a bracket 37 projecting rearwardly therefrom. This mast receiving member 31 and the bracket 37 are formed integrally of a single plate. However, these may be formed as separate members, which then can be fixedly attached to the support cylinder 36.

Referring to the backhoe (rear implement 7), the front side of a base frame 40 is bent into an angular hook shape in its plan view to form, on the right and left sides, a pair of mounting plates 41a in the form of vertical plates. To upper portions of the right and left mounting plates 41a, there is fixed a top plate 41b forming a rearwardly oriented step. A lower plate 41c is inserted and fixed to the lower side of the right and left mounting plates 41a. A pivotal bracket 42 is supported to the rear portion of the base frame 40 to be pivotable about a vertical axis. On the top of the base frame 40, there is mounted a steering unit which can be steered from the rearwardly oriented driver's seat. The base frame 40 mounts, on the right and left sides thereof, hydraulically driven outriggers (stabilizers) 43.

The above-described bracket 42 can effect a swing movement in the right/left direction by means of a single swing cylinder 44. And, to this pivotal bracket 42, base portions of the boom 45 and the boom cylinder 46 are pivoted. In operation, the boom cylinder 46 can pivot the boom 45 vertically. An arm 47 is pivoted to the leading end of the boom 45 to be vertically pivotable by an arm cylinder 48. A bucket 49 is pivotally attached to the leading end of the arm 47, so that the bucket can effect a scooping/dumping operation with a bucket cylinder 50.

Each one of he right and left mounting plates 41a of the backhoe includes engaging portions 51 and 52 at upper and lower positions thereof The upper and lower engaging portions 51, 52 are detachably connected to an upper connecting portion RU and a lower connecting portion RD of a vertical connecting portion R provided at the rear end of the mounting frame 3, so that the backhoe can be attached/detached to/from the tractor body 2.

The upper engaging portion 51 is formed by securing a member having an angular hook shape in its plan view, to the mounting plate 41a and the top plate 41b and this upper engaging portion 51 and the upper connecting portion RU respectively define pin holes. Then, by bringing these holes into coaxial opposition, a pin 53 is inserted for connecting them together.

The lower engaging portion 52 is formed of a pin (connecting bar) 54 which extends through and is fixed to the mounting plate 41a and which also is welded to the front end of the lower plate 41c. The lower connecting portion RD is provided in the form of an upwardly open hook (recess) and with the pin 54 of the lower engaging portion 52 being engaged with the hook-like lower connecting portion RD, the base frame 40 will be pivoted so as to bring the upper engaging portion 51 and the upper connecting portion RU into opposition to each other for allowing insertion of the pin 53.

Figure 1:
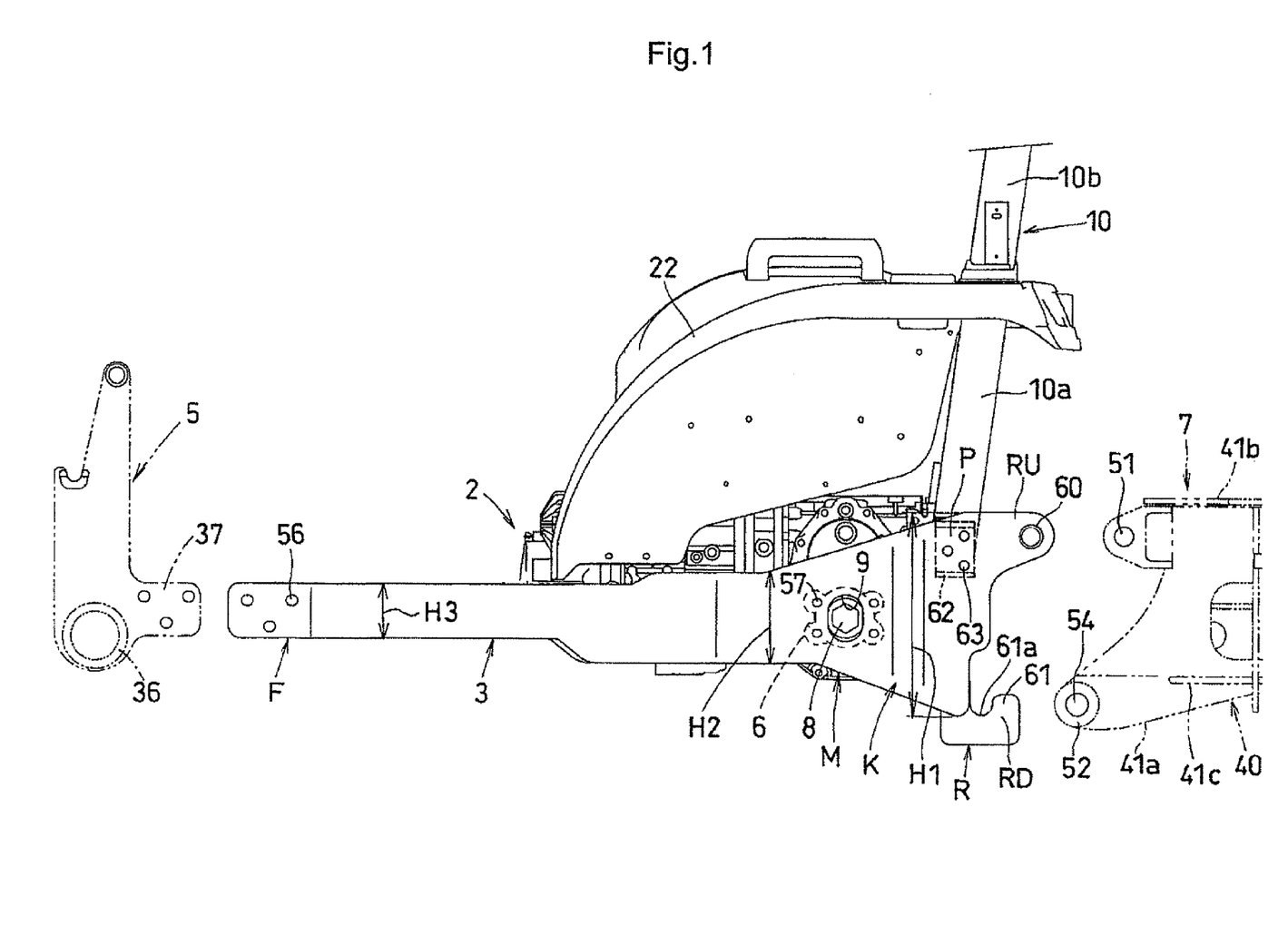
FIG. 1 a side view of a mounting frame illustrating an embodiment of the present invention, FIG. 2 a plan view of the mounting frame, FIG. 3 an overall side view of a tractor-front loader-backhoe, FIG. 4 a plan view showing the mounting frame under it assembled condition, FIG. 5 a side view in section showing principal portions of a rear implement, FIG. 6 a plan view of the principal portions of the rear implement, FIG. 7 a plan view for explaining a pivotal operation of a pivotal bracket of the rear implement, and FIG. 8 a side view of a mounting frame illustrating a further embodiment of the present invention.
Figure 2:
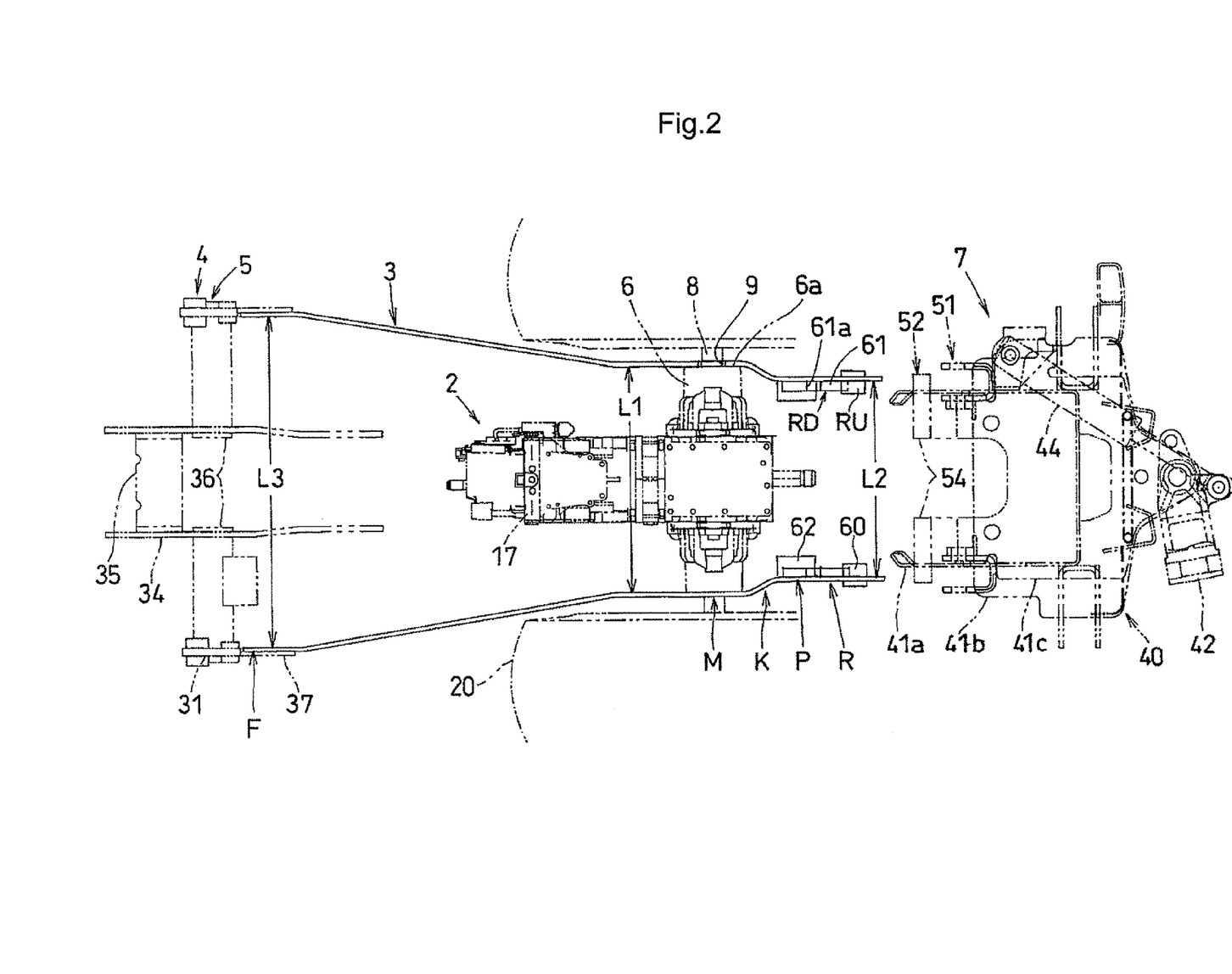

The mounting frame 3 is formed of a plate member having a plate thickness along the right/left direction, and a pair of mounting frames 3 are provided and disposed longitudinally along the front/rear direction on the right and left side faces of the tractor body 2. Each one of the right and left mounting frames 3 includes a front mounting portion F provided at the front, a case mounting portion M provided at an intermediate portion, the vertical connecting portion R provided at the rear end, a rear erect frame connecting portion P provided between the case mounting portion M and the vertical connecting portion R and a bent portion K.

As shown in FIG. 1 and FIG. 2, the mounting frame 3 is formed like a tie plate, from its intermediate portion to its front end and at its front end, there is formed the front mounting portion F having a bolt hole 56, so that the frame is bolt-fixed to the bracket 37 of the mounting body 5 for mounting the front implement 4.

The case mounting portion M is formed at an intermediate portion of the mounting frame 3 adjacent its rear portion. And, this portion includes an insertion hole 9 for inserting the rear axle 8 and a bolt hole 57 provided in its periphery. Then, with insertion of the rear axle 8 into the insertion hole 7, the case mounting portion M is attached to the outer end face of the rear axle case 6 around in the periphery of the rear axle 8, with insertion of a bolt through the bolt hole 57.

The insertion hole 9 has an oval shape to allow vertical position adjustment of the mounting frame 3. However, this hole can have a circular shape, instead, What is required here is to allow insertion of the flange-less rear axle 8. The rear wheel 20 will be attached with a disc being non-rotatably engaged with the rear axle 8.

Unlike the prior art, the mounting frame 3 has no cutout engaging portion. Instead, the insertion hole 9 is formed to surround the entire perimeter of the rear axle 8. As a result, significant stress concentration will not occur and even if no reinforcing member is provided, the single plate member per se can ensure sufficient strength.

The vertical connecting portion R is formed rearwardly of the case mounting portion M and is divided vertically into the upper connecting portion RU and the lower connecting portion RD. As described above, this portion R can engage and connect the upper and lower engaging portions 51, 52 of the respective right and left backhoe mounting plates 41a.

The upper connecting portion RU is formed by fixing a boss member 50 to a rear upper portion of the mounting frame 3 and allows insertion of the connecting pin 53 extending through the upper engaging portion 51. The lower connecting portion RD is formed by fixing a receiving member 61 having a semicircular concave portion 61a to a rear lower portion of the mounting frame 3, so that a pin portion 54 forming the lower engaging portion 52 may be engaged and received within the semicircular concave portion 61.

To the rear erect frame connecting portion P, a bracket 62 is fixed, and this portion forms a bolt hole 63 extending through the mounting frame 3 and the bracket 62 and the right and left leg portions 10a of the portal shaped rear erect frame 10 are bolt-connected. Instead, the rear erect frame 10 can be formed as one integral member from the right and left leg portions 10a to the upper portion.

Referring to the planar shape of the mounting frame 3, relative to the case mounting portion M, its front side flares in a way to progressively depart from the tractor body 2 and its rear side extends narrower to progressively approach the tractor body 2. More particularly, a right/left distance L3 between the front mounting portions F is set larger than a right/left distance L1 between the case mounting portions M. And, a right/left distance L2 between the vertical connecting portions R is set smaller than the right/left distance L1 between the case mounting portions M. This right/left distance L2 of the vertical connecting portions R is set as such a distance as allows insertion of the mounting plate 41a of the rear implement 7 and engagement of the upper and lower engaging portions 51, 52.

The bent portion K between this case mounting portion M and the vertical connecting portion R is bent in the form of "S" and extends vertically along the mounting frame 3. With the bent portion K, the case mounting portion M and the vertical connecting portion R are caused to extend along the front/rear direction and in parallel with each other.

The bent portion K renders the right/left distance L2 of the vertical connecting portions R smaller than the right/left distance L1 of the outer end faces 6a of the right and left rear axle cases 6, so as to allow mounting of an existing rear implement 7. Further, this bent portion K acts as a reinforcing portion like a rib so as to endure a right/left bending vertically between the mounting frames 3.

Referring to the lateral face shape of the mounting frame 3, the frame has a vertical size H which progressively increases from the front side of the case mounting portion M to the vertical connecting portion R. The vertical size H1 is at its maximum at the vertical connecting portion R. And, at the beginning of the flaring at the portion forwardly of the case mounting portion M, a vertical size H2 is slightly greater than a vertical size H3 at the front mounting portion F.

Further, the height of the front mounting portion F is substantially same as the height of the insertion hole 9 of the case mounting portion M. And, the flaring from the case mounting portion M to the vertical connecting portion R extends not only upwardly, but also downwardly.

With these arrangements, the right and left mounting frames 3 can connect the rear implement 7 and the rear erect frame 10. Further, the frames can sufficiently support load applied during a work from the front implement 4 and the rear implement 7 to the tractor body 2 and can also distribute the load effectively.

Figure 5:
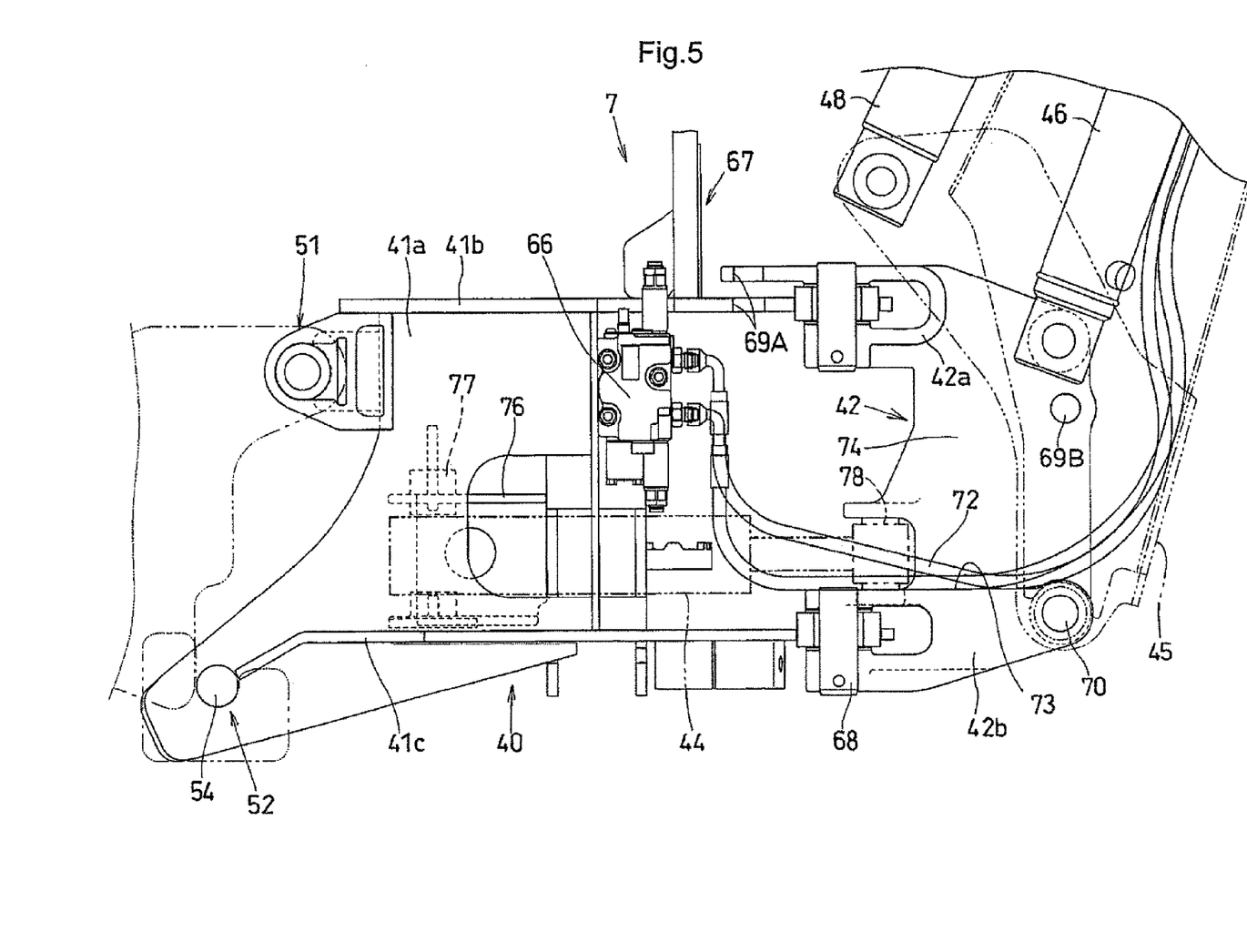
Figure 6:
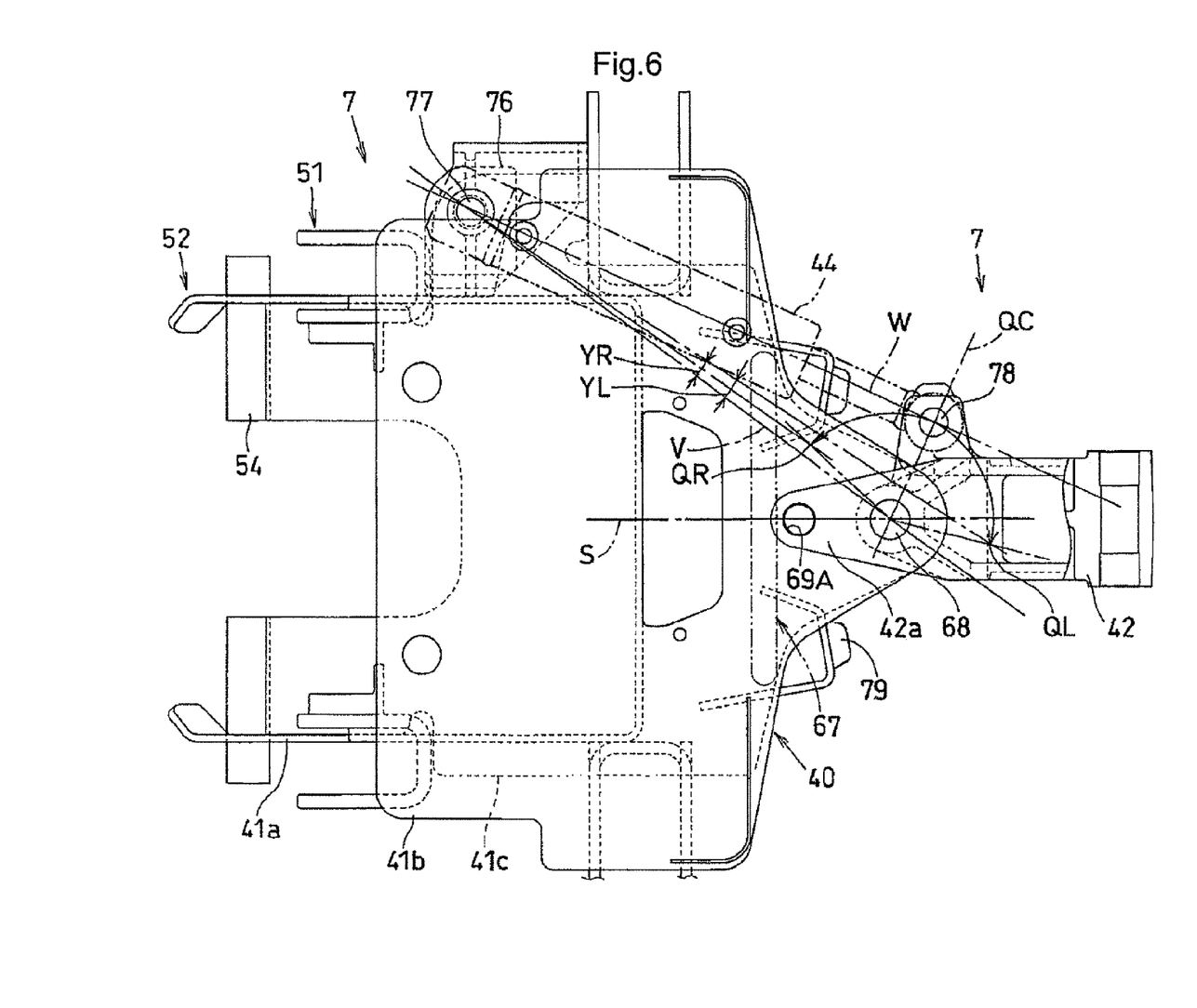
Figure 7:
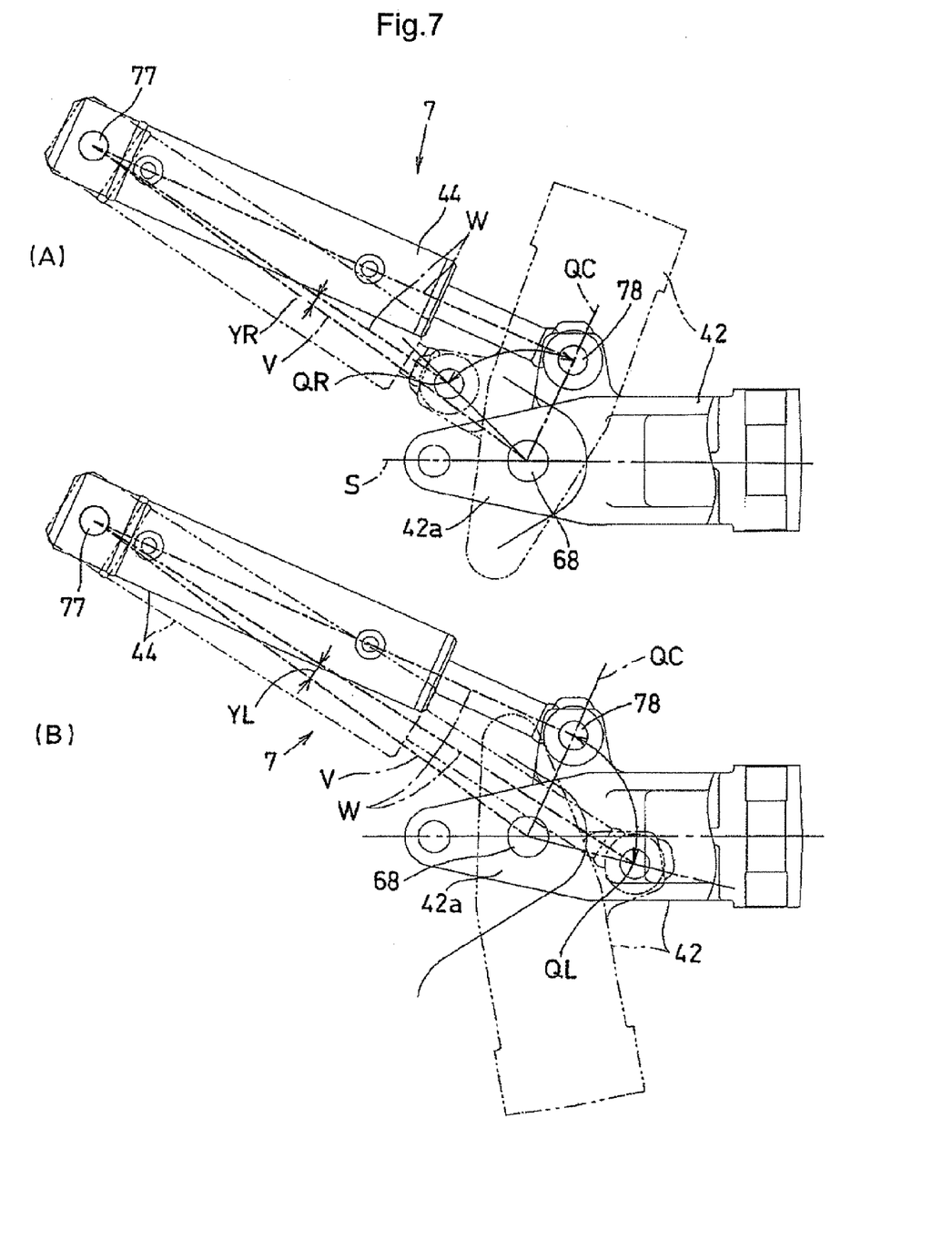

FIGS. 5 through 7 show details of the backhoe (rear implement 7). Within the base frame 40, there is mounted a control valve 66 with its spool oriented vertically. And, on the top plate 41b disposed upwardly thereof, there is mounted a steering unit 67. At rear ends of the top plate 41b and the lower plate 41c, there are engaged vertical shaft supporting portions 42a, 42b formed integrally with the front end of the bracket 42 and having a U-shape in their side view and upper and lower short shafts 68 are provided for pivotal connection.

The upper shaft bearing portion 42a and the top plate 41b define holes 69A for inserting a lock pin for fixing the pivotal bracket 42 at its right/left center. And, the right and left side walls of the pivotal bracket 42 and the base portion of the boom 45 define holes 69B for inserting a lock pin for retaining the boom 45 under its lifted condition.

Referring to the pivotal bracket 42, upper portions of the right and left side walls are interconnected via the upper shaft supporting portion 42a for supporting the upper vertical shaft 68 and lower portions of the right and left side walls are interconnected via the lower shaft supporting portion 42b for supporting the lower vertical shaft 68 and a boom shaft 70 and the portion supporting the boom shaft 70 is formed tubular.

The pivotal bracket 42 has a hollow construction, so that between the upper and lower shaft supporting portions 42a, 42b and between the right and left side walls, there is formed a hydraulic hose inserting space 74 for allowing insertion of a hydraulic hose 72 extending across the boom cylinder 46, the arm cylinder 48 and the bucket cylinder 50, thus improving the freedom of pivotal displacement of the hydraulic hose 72.

The top face of the lower shaft supporting portion 42b is formed as a flat bottom face, so as to minimize possible damage to the hydraulic hose 72 if in contact therewith, which hose is extended from the control valve 66 toward the boom 45. Further, for facilitating the insertion, there is formed a guide face 73 for guiding the insertion. Incidentally, the arm cylinder 48 has its tube side pivotally supported to the boom 45. Instead, its piston rod side may be connected to the boom 45.

The tube side of the single swing cylinder 44 is supported via a base shaft 77 to a shaft supporting portion 76, on the outer side of the right mounting plate 41a and its piston rod side is connected via a connecting pin 78 to the pivotal bracket 42, so that the cylinder is disposed with such inclination to be closer to a right/left centerline S of the base frame 40 from the cylinder tube side toward the piston rod side.

When the pivotal bracket 42 is located on the centerline S, the connecting pin 78 of the swing cylinder 44 is located at a neutral position QC of the right/left pivotal movement. The bracket can be pivoted to the right from this neutral position QC to a right position QR (the condition shown in FIG. 6 and FIG. 7A) and can also be pivoted to the left from the neutral position QC to a left position QL (the condition shown in FIG. 6 and FIG. 7B).

Relative to a reference centerline V extending through the base shaft 77 of the swing cylinder 44 and the vertical shaft 68, a centerline W extending through the base shaft 77 of the swing cylinder 44 and the connecting pin 78 forms a narrow angle Y. This angle Y is set such that a narrow angle YR formed when the pivotal bracket 42 is located at the right position QR is smaller than a narrow angle YL when the bracket 42 is located at the left position QL.

The connecting pin 78 of the swing cylinder 44, when located at the neutral position QC, is offset from the vertical shaft 68 to the right pivotal side relative to the direction normal to the reference centerline V, so that a pivotal angle from the neutral position QC to the right position QR is greater than a pivotal angle from the same to the left position QL. Numeral 79 in FIG. 6 denotes a cushioned stopper for the pivotal bracket 42 provided at the rear end of the base frame 40.

Referring to the swing cylinder 44, the pressure receiving area of the piston is larger in the piston rod expanding direction (toward the side where the piston rod is absent) than in the piston rod contracting direction (toward the side where the piston rod is present). Therefore, the cylinder 44 pivots the pivotal bracket 42 by a larger amount on the side where the piston rod is absent, thus generating a greater inertia. For this reason, the narrow angle YL is set greater than the narrow angle YR, so as to restrict the shock to the cushioned stopper 79.

With the above-described settings of the inclined disposition of the cylinder centerline W of the swing cylinder 44 relative to the centerline S when the pivotal bracket 42 is located at the neutral position QC, the offset to the right pivotal side relative to the direction normal to the reference centerline V, and the narrow angles Y of the right position QR and the left position QL relative to the reference centerline V, the swing cylinder 44 does not allow the piston to reach its dead point in its expansion/contraction and can swing the pivotal bracket 42 in an efficient manner and can also minimize the shock which occurs at the time of maximum angle pivotal movement in the expanding direction.

Incidentally, the shapes and the positional relationships in the front/rear direction, right/left direction and upper/lower direction of the respective components in the foregoing embodiment are best when constructed as shown in FIGS. 1 through 7. However, these are not limited to the ones in the illustrated embodiment. Various modifications of the members and the arrangements and changes of combinations thereof are possible.

For instance, in case the tractor body 2 is constructed as a specialized machine for mounting the rear implement 7 only, the front mounting portion F can be omitted. The upper connecting portion RU can be formed of a pin and a mounting device can be provided for effecting automatic engagement with retaining this pin to the upper engaging portion 51. Further, in the foregoing embodiment, the lower connecting portion UD is formed by welding a thick plate to the mounting frame 3. Instead, this can be formed integrally with the mounting frame. Further, the right and left mounting frames 3 can be interconnected via a member extending rearwardly or downwardly of the tractor body 2.

Other Embodiments

The attaching construction of attaching the mounting frame 3 to the rear axle is not limited to the one described above. This can be constructed instead as shown in FIG. 8 for instance.

Figure 8:
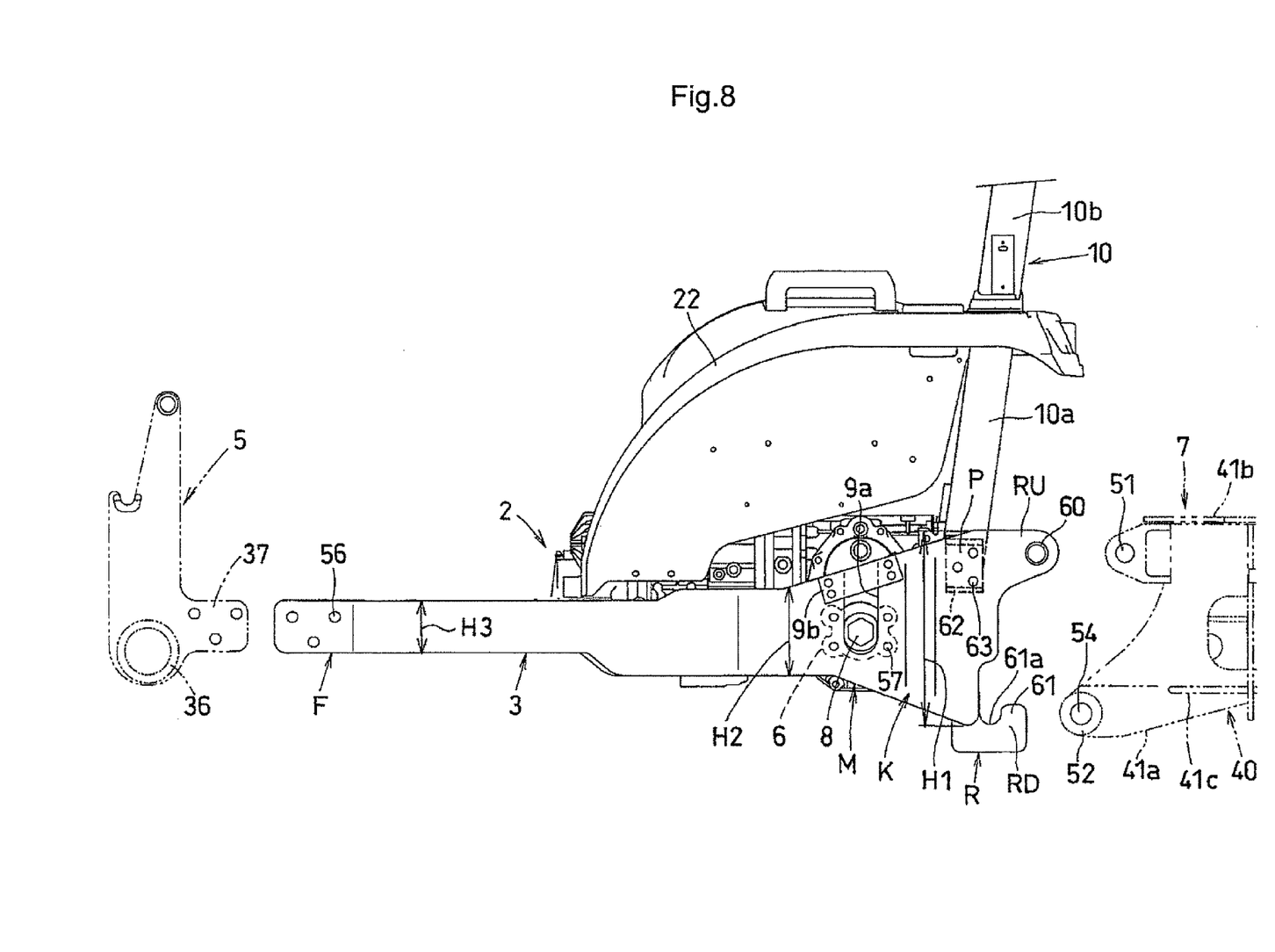

In FIG. 8, the case mounting portion M of the mounting frame 3 defines an insertion hole through which the rear axle 8 is inserted and forms also a cutout portion 9a which communicates the insertion hole with the upper end of the case mounting portion M. In the case of this embodiment, for attaching the respective right and left mounting frames 3 to the rear axle case 6, the rear axle 8 will be inserted through the cutout portion 9a from under the rear axle 8. Further, under this condition of the rear axle 8 being inserted into this insertion hole, the periphery of the insertion hole is attached to the outer end face 6a of the rear axle case 6. Further, in order to close the portion of the cutout portion 9a, a reinforcing member 9c is bolt-attached to the vicinity of the upper end of the case mounting portion M. Incidentally, the attachment of the reinforcing member 9b is not limited to the use of such bolt, but can be done by e.g. welding.

Further, though not shown, in the case mounting portion M of the mounting frame 3, there can be formed a large cutout-like engaging portion for engaging the rear axle case 6 with the case mounting portion M of the mounting frame 3 from under the same. And, the portions forwardly and rearwardly of the cutout which has been weakened by the formation of the cutout-like engaging portion can be reinforced by being connected with an engaging portion reinforcing member provided upwardly of the rear axle case. In this case, a support member or the like can be provided separately, so as to mount the rear axle case 6 to the case mounting portion M of the mounting frame 3.

DESCRIPTION OF REFERENCE MARKS 1 tractor-front loader-backhoe
2 tractor body
3 mounting frame
6 rear axle case 7 rear implement (backhoe)
8 rear ale
9 insertion hole
10 rear erect frame
10a leg portion
F front mounting portion
M case mounting portion
R vertical connecting portion
K bent portion
P rear erect frame connecting portion
L right/left distance
H vertical size

The invention claimed is:

1. A rear implement mounting frame construction for a tractor, the construction comprising:
   a pair of mounting frames attached respectively to right and left sides of a tractor body; and
   each of said right and left mounting frames comprising a plate member having a plate thickness oriented along a right/left direction with respect to a front side of the tractor, said plate member including a case mounting portion to be connected to a rear axle case of the tractor body and a vertical connecting portion formed rearwardly of said case mounting portion and for connecting a rear implement,
   wherein each of said case mounting portions includes an insertion hole for inserting a rear axle, a cutout portion which places the insertion hole in communication with an upper end of the case mounting portion, and a bolt hole provided in a periphery of said rear axle, said cutout portion having a width that is substantially the same as the width of said rear axle, and a bolt being inserted through said bolt hole, said rear axle case being guided to said insertion hole by said cutout portion having the substantially same width as said rear axle;
   wherein, as viewed from an outer side to an inner side in a lateral width direction of the tractor body, said case mounting portion and an outermost end face of said rear axle case are overlappedly disposed with the case mounting portion preceding the outermost end face of said rear axle case;
   wherein said rear axle case includes a second bolt hole provided in outermost end face thereof, the bolt being fastened to extend between said second bolt hole and said bolt hole provided in said case mounting portion as viewed from the outer side to the inner side in the lateral width direction of the tractor body, and said mounting frames being attached to said outermost end face of said rear axle case, and
   wherein a reinforcing member is attached to the vicinity of the upper end of the case mounting portion to close said cutout portion.

2. The rear implement mounting frame construction for a tractor, as defined in claim 1, further comprising:
   a bent portion formed between said case mounting portion and said vertical connecting portion, said bent portion causing said vertical connecting portion to be disposed closer to the tractor body than said case mounting portion; and
   a right/left distance between said pair of vertical connecting portions being set smaller than a right/left distance between said pair of case mounting portions,
   wherein at said bent portion, a right/left distance between said pair of mounting frames is progressively decreased from said right/left distance between the pair of case mounting portions to said right/left distance between said pair of vertical connecting portions.

3. The rear implement mounting frame construction for a tractor, as defined in claim 1, wherein a vertical size of said each mounting frame is progressively increased from said case mounting portion to said vertical connecting portion.

4. The rear implement mounting frame construction for a tractor, as defined in claim 1, wherein in said each right and left mounting frames, forwardly of an upper connecting portion of said vertical connecting portion, there is connected a right or left leg portion of a rear erect frame having a portal shape.

5. The rear implement mounting frame construction for a tractor, as defined in claim 1, wherein when said rear axle case being guided to said insertion hole by said cutout portion, said second bolt hole provided in said outermost end face of said rear axle case comes into alignment with said bolt hole provided in said case mounting portion.

* * * * *